United States Patent [19]

McCormick

[11] 4,166,157
[45] Aug. 28, 1979

[54] DOUBLE SEALABLE BUTTON CELL WITH CORROSION RESISTANT CAN AND METHOD

[75] Inventor: Robert J. McCormick, Westfield, N.J.

[73] Assignee: Exxon Research & Engineering Co., Florham Park, N.J.

[21] Appl. No.: 929,286

[22] Filed: Jul. 31, 1978

Related U.S. Application Data

[63] Continuation of Ser. No. 814,397, Jul. 11, 1977, abandoned.

[51] Int. Cl.² .............................................. H01M 2/08
[52] U.S. Cl. ..................................... 429/174; 29/623.2
[58] Field of Search ....................... 429/162, 174, 178; 29/623.2

[56] References Cited

U.S. PATENT DOCUMENTS

| 2,812,377 | 11/1957 | Franquemont | 429/162 |
| 3,480,481 | 11/1969 | Gauthier et al. | 429/174 |
| 3,791,873 | 2/1974 | Angelovich | 429/174 |

Primary Examiner—Donald L. Walton
Attorney, Agent, or Firm—Kenneth P. Glynn

[57] ABSTRACT

A novel button cell having a corrosion resistant can and being double sealable is described. The cell is basically made of four components, a conductive metal can, a conductive thermoplastic layer in the can, a conductive metal cover and a dielectric thermoplastic gasket molded around the cover. The conductive thermoplastic layer is disposed on the inner surfaces of the can so as to extend over at least all of the inner surface of the bottom of the can. The conductive metal cover has a sidewall which includes a U-shape configuration, and the dielectric thermoplastic gasket is insert molded around the sidewall of the cover and a part of the top of the cover so as to extend over all surfaces of the cover except a center portion, inner and outer surfaces, of the top of the cover. The dielectric thermoplastic gasket has a tapered projection located below the U-shape configuration. The combination of the conductive metal cover and the dielectric thermoplastic gasket has a total height which is less than the height of the sidewall of the can and is adapted so as to cooperate with and fit into the can. A method of double sealing this cell is also described. This involves the establishment of a dielectric plastic to conductive plastic weld between the gasket and the conductive thermoplastic layer to form the first seal, and a subsequent crimping of the can wall over the gasket to form the second seal.

20 Claims, 3 Drawing Figures

DOUBLE SEALABLE BUTTON CELL WITH CORROSION RESISTANT CAN AND METHOD

This is a continuation of application Ser. No. 814,397, filed July 11, 1977 now abandoned.

BACKGROUND OF THE INVENTION

The present invention is directed to electrochemical cells generally known as button cells, and to a method of sealing such cells. More particularly, the present invention is directed to a double sealable button cell with a corrosion resistant can, and to a method of double sealing the can.

The need for button type electrochemical cells has mushroomed with the advent of the electric watch and other electronic devices. As a result, the recent prior art is replete with button cell configurations to serve particular needs. For example, U.S. Pat. No. 4,021,598, Naruishi et al, illustrates one type of conventional button cell having a conductive can and a conductive cover with an insulative gasket therebetween, with sealing achieved by crimping the upper portion of the can wall over gasket and cover. While such cells are satisfactory for some types of electrochemical components, the need for better sealing developed for certain corrosive or leakable electrochemical components. Thus, for example, U.S. Pat. Nos. 4,015,056 (Megahed et al) and 4,009,0456 (Megahed et al) show one approach to further leakage prevention, i.e., the use of the double top. U.S. Pat. Nos. 4,015,055 (Langan et al) and 4,008,357 (Nishimura et al) show the use of a U-shape flange top for enhanced crimping seal. In complicated metal/air and metal/oxygen cells where subassembly components and predetermined gas spaces are required multiple sealing techniques have been applied. Thus, for example, in U.S. Pat. No. 3,746,580 (Aker et al) a gas depolarizable metal/air cell is described which has an insert molded cathode subassembly with non-conductive plastic portions which are sealed, e.g., by heat or ultrasons, to an anode assembly at certain of its non-conductive plastic portions. The resulting assemblage is further sealed in a crimped can fashion.

Not only have enhanced sealing means been developed to prevent leakage, but leakage by corrosion of metallic parts has been a problem when certain electrochemical components are used. Thus, for example, U.S. Pat. Nos. 3,756,856 (Tennenhouse) and 2,812,377 (Franquemont) disclose the use of conductive carbon plastic coatings to render cell metal parts corrosion resistant yet conductive.

Notwithstanding all of the foregoing teachings of the prior art, it is believed that the unique button cell of the present invention has not heretofore been taught nor rendered obvious.

BRIEF SUMMARY OF THE INVENTION

The present invention is directed to a button cell having a corrosion resistant can and being double sealable. The cell is basically made of four components, a conductive metal can, a conductive thermoplastic layer in the can, a conductive metal cover and a dielectric thermoplastic gasket molded around the cover. The conductive thermoplastic layer is disposed on the inner surfaces of the can so as to extend over at least all of the inner surface of the bottom of the can. The conductive metal cover has a sidewall which includes a U-shaped configuration, and the dielectric thermoplastic gasket is insert molded around the sidewall of the cover and a part of the top of the cover so as to extend over all surfaces of the cover except a center portion, inner and outer surfaces, of the top of the cover. The dielectric thermoplastic gasket has a tapered projection located below the U-shape configuration. The combination of the conductive metal cover and the dielectric thermoplastic gasket has a total height which is less than the height of the sidewall of the can and is adapted so as to cooperate with and fit into the can.

The present invention is also directed to a method of double sealing the button cell. This involves the establishment of a dielectric plastic to conductive plastic weld between the gasket and the conductive thermoplastic layer to form a first seal, and the subsequent crimping of the can wall over the gasket to form the second seal.

DETAILED DESCRIPTION OF THE INVENTION

As mentioned, the button cell of the present invention is basically made of four components, the can, the conductive thermoplastic layer, the cover and the dielectric thermoplastic layer.

The conductive metal can and cover used in the cell of the present invention may be made of any metal or alloy which is adequately conductive to conduct electrical current, and these materials are well known to the artisan. For example, they may be made of nickel plated steel, nickel, alloys of nickel, stainless steel, copper clad steels, gold plated metals or the like. Typically the can and cover need not be made of the identical materials, but are chosen to be best suited for the particular electrochemical components used in the cell. Also, the particular shape of the can and cover are not critical in terms of their horizontal cross-sections. Thus, for example, hexagonal, oblong or any other desired configuraton might be used, although the circular design is preferred because it is perhaps most easily crimped.

The conductive thermoplastic layer and the dielectric thermoplastic gasket used in the cell of the present invention may contain the same or different thermoplastics. These thermoplastics may be any thermoplastic material which is inert to the electrochemical components to be used. In addition, inert fillers as well as other physical property enhancing additives may be included in the thermoplastic material. Thus, fillers such as minerals, asbestos, glass fibers, extenders, plasticizers, flame retardants, etc., may be included. Examples of suitable thermoplastic materials include the entire family of polyolefins (polyethylene, polypropylene, propylene co-polymer, polybutylene, etc.), the family of fluoropolymers (FEP, PTFE, CTFE, $PVF_2$, etc.), the family of polyamides (including various nylon blends and their co-polymers, etc.). Among these, the polyolefins such as polyethylene, polypropylene, polybutylene, and the various polyolefin, homopolymers and copolymers are preferred. Since the above materials may or may not include fillers and/or other additives, it should be understood that the term "thermoplastic" as used herein shall be taken to mean the foregoing thermoplastic materials alone when used alone in the cell of the present invention, and to mean these thermoplastic materials with any of the mentioned additives in those instances in which the additives are to be included with the thermoplastic materials in the cell of the present invention.

The dielectric thermoplastic gasket used in the cell of the present invention may be made exclusively of the thermoplastics described. However, the conductive plastic layer used in the cell of the present invention must contain conductive material in addition to the thermoplastic. Any relatively inert conductive material may be used with the thermoplastic, provided that it is used in an amount sufficient to render the resulting material adequately conductive. A preferred conductive material is particulate conductive carbon. In general the particulate conductive carbon is one having a particle size in the range of about 20 mu to about 50 mu, desirably about 20 mu to about 30 mu, and these generally may have an $N_2$ surface area measurement of about 200 to about 1000 $m^2$/gram.

The particulate conductive carbon may be any of the electrically conductive-type carbon particles such as graphite and carbon black. Two types of carbon blacks which are particularly suitable because of the ease with which they may be compounded with various plastics are those known by the trademarks Ketjenblack EC (sold by Noury Chemical Corp. of Burt, N.Y.) and Cabot "Vulcan X-72" (sold by Cabot Corp. of Boston, Mass.). Other commercially available particulate conductive carbon may be used as will be recognized by the artisan.

The thermoplastic and the conductive carbon may be mixed by conventional techniques, e.g., powder plastic and carbon mixing with subsequent melting and molding or hot melt mixing. As mentioned the amount of conductive material to be used should be an amount sufficient to render the resulting material adequately conductive. This amount will vary greatly amoung different conductive materials. For example, it has been found that even as between the two trademark designated carbon black materials mentioned, significantly different amounts are required to obtain the same conductivity, all other materials being the same. For this reason, it is more convenient to define the amount of conductive material to be used in terms of conductivities obtained. Thus, in the conductive thermoplastic layer in the button cell of the present invention, sufficient conductive material should be included so as to obtain a conductivity, in general, of at least about 5 ohm-cm. as measured by ASTM D-257. A desirable conductivity range to be obtained is about 5 ohm-cm. to about 0.5 ohm-cm., preferably about 1.0 ohm-cm. to about 0.5 ohm-cm.

In forming the double sealable button cell of the present invention, the can and cover are formed from one or more of the above-mentioned materials by known techniques such as pressing and the like. The can is formed so as to have a bottom and a continuous sidewall disposed around the periphery of the bottom. The cover is formed so as to have a top and a continuous sidewall disposed around the periphery of the top, with the sidewall being disposed in a U-shape configuration at its end opposite the top. The thickness of the can and cover are of no criticality to the present invention, although, as a practical matter they should be thick enough to yield a cell of the designed structural and other physical properties, yet be thin enough to be commercially and competitively producible. The can and cover may contain optional raised or depressed portions so as to enhance contact with outside circuitry, as desired. While raised or depressed portions are not necessary they may be conveniently included to permit easier circuitry contact. An exemplary optional raised portion on a cover is illustrated in the drawings, discussed below.

A conductive thermoplastic layer is disposed on the inner surfaces of the can so as to extend over at least all of the inner surface of the bottom of the can. This conductive thermoplastic layer may be preformed and pressed or otherwise disposed within the can or may be molded in place.

A dielectric thermoplastic gasket is insert molded around the continuous sidewall of the cover and a part of the cover so as to extend over all of the surfaces of the continuous sidewall, including the U-shape configuration and to extend over a part of the top of the cover on its inner and outer surfaces. In this manner, only a center portion of the inner and outer surfaces of the cover remains exposed, and the exposed area acts as a contact between outside circuitry and an inside electrical component, e.g., an anodic material. Further, this dielectric thermoplastic gasket (or grommet) is formed with a tapered projection located below the U-shape configuration. This acts as a heat or energy director and forms the initial contact point for the first sealing of the cell.

The combination of the conductive metal cover and the dielectric thermoplastic gasket insert molded around it are formed so as to have a total height which is less than the height of the continuous sidewall of the can. Also, this combination is adapted so as to cooperate with and to fit into the conductive metal can. The height of the sidewall of the can is sufficient so as to enable crimp sealing yet is not so high as to create shorting with the exposed center portion of the cover upon crimping.

The resulting can with its conductive thermoplastic layer and cover with its dielectric thermoplastic gasket is double sealable with a corrosion resistant can which, after sealing, is totally protected by thermoplastic on all inner surfaces. The double sealable button cell, of course, has the desired electrochemical components placed within it prior to sealing. These components are conventional and may include anodic material, electrolyte, supports, separators and cathodic material, as well as other components, in a singular stacked fashion or with some components in admixture, e.g., cathodic material and electrolyte. After the electrochemical components are placed within the cell, either in the cover, or in the can with space for the cover and gasket, the cell is double sealed.

The first seal of the cell of the present invention is achieved by a conductive thermoplastic-to-dielectric thermoplastic weld. This weld is accomplished by welding the tapered projection of the gasket to the conductive thermoplastic layer. The cover is fitted into the can so as to make contact between the gasket and layer, as mentioned and the contact area is welded. The application of localized heat is essential to the proper flow of the tapered projection and the layer. While localized heat welding may be used, ultrasonic welding is preferred. Thus, the tapered projection advantageously acts as an energy director and during ultrasonic welding directs the vibrational and resulting thermal energy to the point of contact. The result is a weld between the gasket and the conductive layer with a can having a conductive thermoplastic layer in the bottom and a dielectric thermoplastic layer on all inner surfaces of its sidewalls. This results in an enhanced resistance to corrosion and permits the use of electrochemical components which are otherwise harmful to metal cans. The gasket which is dielectric and is molded around the cover becomes also an integral welded portion of the can and acts both to complete the first seal of the cell and to electrically insulate the cover from the can. The U-shape configuration portion of the cover side-wall likewise performs advantageously. It acts to both keep the gasket on the cover and enhance the first seal, and to prevent the "cutting" of the top sidewall through the dielectric thermoplastic to the conductive layer to thereby avoid shorting. This is especially important if substantial pressure is applied to the cover during welding.

The second seal of the cell of the present invention is achieved by crimping the sidewall of the can over the top portion of the gasket protected cover. In this step any crimping technique may be used, as long as permanent shorting between the conductive metal cover and the conductive metal can is avoided.

The resulting double sealed cell may have enhanced shelf life due to exclusion of outside elements, e.g., air, from the electrochemical components and may have enhanced corrosion resistance due to the thermoplastic protected inner surfaces of the can. In fact, the resulting cell is believed to be analogous to hermetically sealed cells which require substantially more complicated and expensive methods.

The present invention will be more fully understood by reference to the following discussion and drawings. These are presented only for purposes of illustration and the present invention should not be construed to be limited thereto.

DETAILED DESCRIPTION OF THE INVENTION

Figure 1:
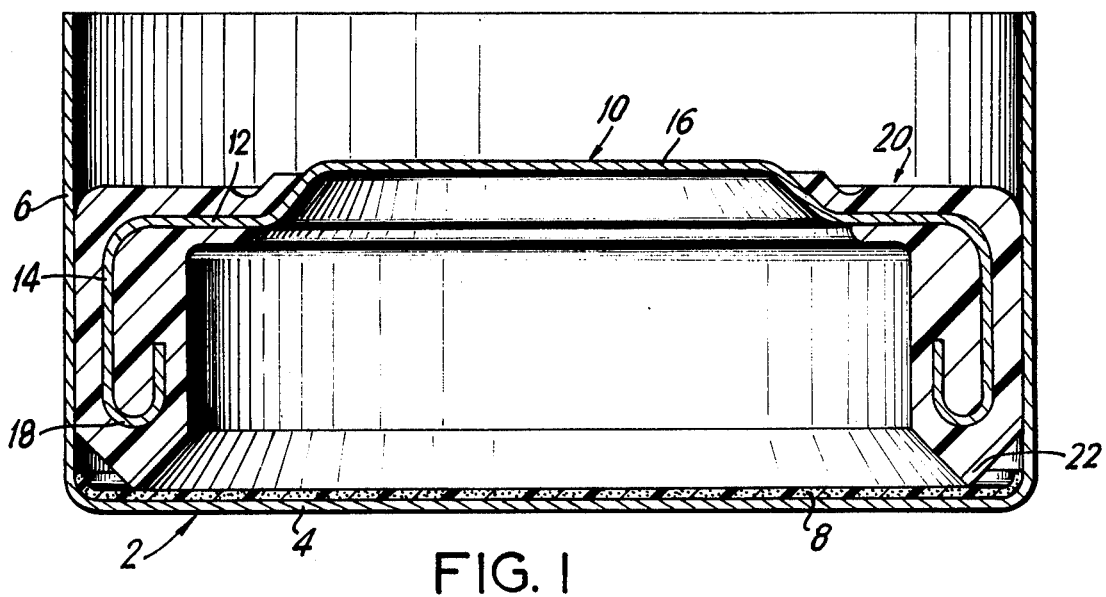
FIG. 1 is a cross-sectional view of a cell of the present invention in an unsealed, empty state.

FIG. 1 illustrates one embodiment of the cell of the present invention in an unsealed, empty state. A conductive metal can, e.g., nickel plated stainless steel or other metal, shown generally as 2, has a bottom 4 and a continuous sidewall 6 disposed around the periphery of bottom 4. The metal can 2 has inner surfaces and outer surfaces as shown. A conductive thermoplastic layer 8, e.g., polypropylene with adequate particulate carbon to render the layer conductive, is deposited on the inner surfaces of can 2 so as to cover at least all of the inner surface of bottom 4.

A conductive metal cover 10, has a top 12 and a continuous sidewall 14 disposed around the periphery of top 12. (Top 12 may be generally flat, but in this embodiment is shown with an optional raised portion 16.) Cover 10 has inner surfaces and outer surfaces as shown. Cover 10 also has a U-shape configuration 18 at the end of sidewall 14 which is opposite top 12. This U-shape configuration may be disposed inwardly, as shown, or it may be disposed outwardly. A dielectric thermoplastic gasket 20 is insert molded around continuous sidewall 14 and part of top 12. This gasket 20 is molded so as to encompass all surfaces of sidewall 14 including U-shape configuration 18 and so as to encompass part of top 12 on its inner and outer surfaces such that only a center portion, e.g., 16, of top 12 remains exposed on its inner and outer surfaces. Gasket 20 has a tapered projection 22 located in the general area below U-shape configuration 18.

As illustrated in FIG. 1, conductive metal cover 10 and dielectric thermoplastic gasket 20 are adapted so as to fit into conductive metal can 2 and have a total height which is less than the height of continuous sidewall 6. It should be noted, however, that the dimensions in these drawings are not completely proportional and that certain dimensions, e.g., the thickness of the gasket and the opening of the U-shape configuration, have been exaggerated for the sake of clarity.

Figure 2:
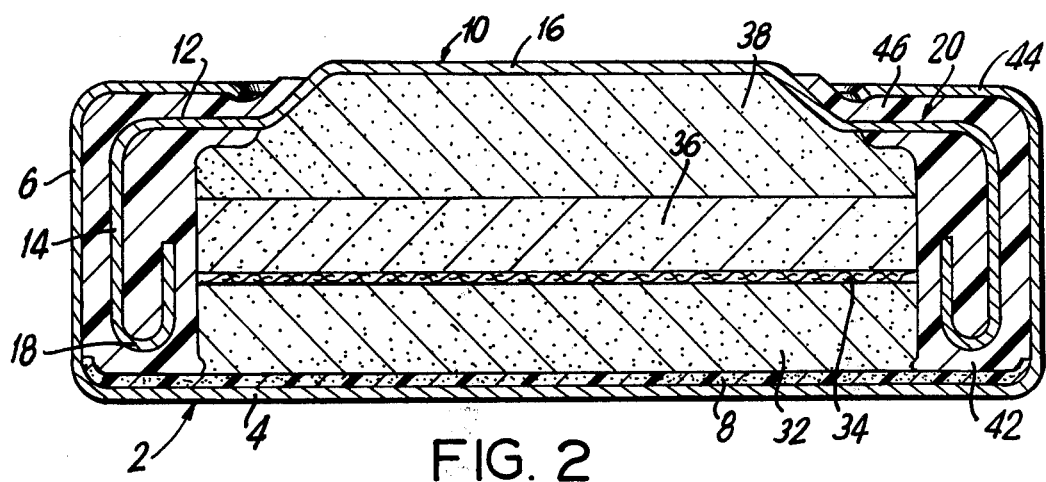
FIGS. 2 and 3 are cross-sectional view of two embodiments of the present invention illustrating sealed cell configurations.

FIG. 2 shows an embodiment of the cell of the present invention in a sealed configuration, containing electrochemical components therein. Parts common to those shown in FIG. 1 are identically numbered. The cell contains electrochemical components in a representative configuration, and many variations may be seen by the artisan. These components are illustrated in a stacked configuration with cathodic material 32 on the bottom, followed by a conventional separator 34, an electrolyte 36, e.g., a cake, a material impregnated with liquid electrolyte or a solid electrolyte, and an anodic material 38 on top. The cathodic material 32 is in electrical contact with conductive thermoplastic layer 8 and thus with can 2, and the anodic material 38 is in direct electrical contact with cover 10.

The arrangement shown in FIG. 2 is achieved using the cell shown in FIG. 1 as follows:

The electrochemical components 32, 34, 36 and 38 are inserted into the inside of the cover or into the inside of the can, in the arrangement shown. The preferred technique is to insert these components into the cover so as to minimize air pocketing. Next, cover 10 is placed inside can 2 much like the illustration of FIG. 1 but with the electrochemical components contained therein. Pressure may be applied to the periphery of the cover 10 while ultrasonic energy is applied to the tapered, pointed projection 22 (FIG. 1) of gasket 20. Ultrasonic welding is achieved and the tapered projection 22 (FIG. 1) flattens out and becomes bonded to layer 8 as shown at 42 (FIG. 2). This ultrasonic weld results in a first complete sealing of the cell. Next the upwardly extended portions 44 of sidewall 6 are folded over (crimped) onto the upper portions 46 of gasket 20. The resulting crimped seal is a second complete sealing of the cell to achieve a double sealed product.

Figure 3:
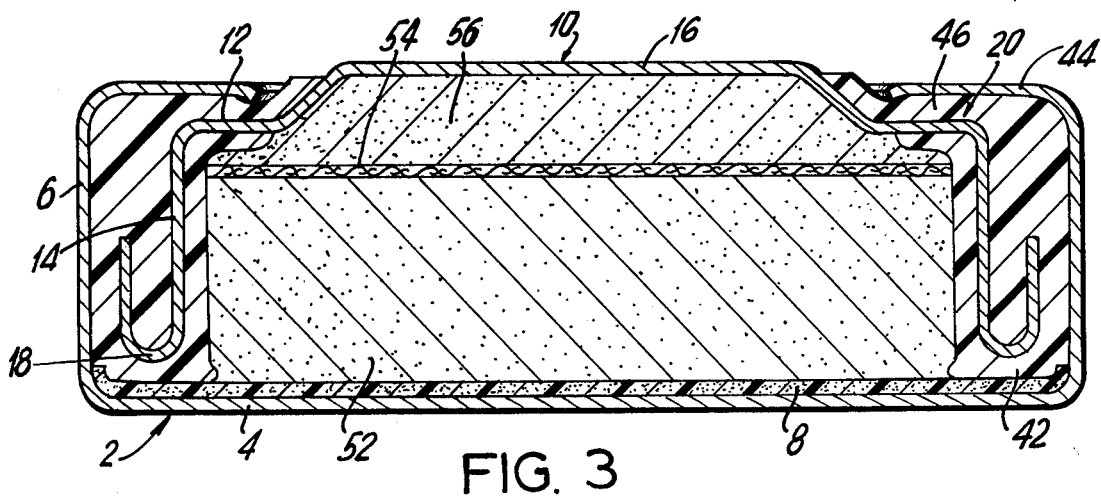

FIG. 3 illustrates a variation on the sealed cell. Parts common to those of FIGS. 1 and 2 are identically numbered. In this embodiment, the U-shape configuration 52 is disposed outwardly rather than inwardly as shown in the preferred embodiments of FIGS. 1 and 2. Also, another electrochemical component arrangement is shown. The cell contains cathodic material 52 which takes the form of a cake with the electrolyte contained therein, e.g., a chalcogenide cathode with lithium perchlorate-organic solvent electrolyte. This cell also contains separator 54 and anodic material 56, e.g., lithium or lithium alloy. This cell may be sealed in the same manner as that described for the cell of FIG. 2.

What is claimed is:
1. An unsealed double sealable cell, comprising:
   (a) a conductive metal can having a bottom and a continuous sidewall disposed around the periphery of the bottom, said can having inner surfaces and outer surfaces;
   (b) a conductive thermoplastic layer disposed on the inner surfaces of said can so as to extend over at least all of the inner surface of the bottom of said can;

(c) a conductive metal cover having a top and a continuous sidewall disposed around the periphery of the top and having inner surfaces and outer surfaces, said sidewall being disposed in a U-shape configuration at its end opposite said top; and (d) a dielectric thermoplastic gasket insert molded around the continuous sidewall of said cover and a part of the top of said cover, said dielectric thermoplastic gasket extending over all surfaces of said continuous sidewall including said U-shape configuration and extending on a part of the top of said cover on its inner and outer surfaces such that only a center portion of the inner and outer surfaces of the top of said cover remains exposed, and said dielectric thermoplastic gasket having a tapered projection located below the U-shape configuration of said cover sidewall;

wherein the combination of said conductive metal cover and said dielectric thermoplastic gasket has a total height which is less than the height of the continuous sidewall of said can and is in cooperation with and fitted into said conductive metal can.

2. The cell of claim 1 wherein the thermoplastic in said conductive thermoplastic layer contains a plastic selected from the group consisting of polyolefins, fluoropolymers and polyamides.

3. The cell of claim 1 wherein said dielectric thermoplastic gasket contains a plastic selected from the group consisting of polyolefins, fluoropolymers and polyamides.

4. The cell of claim 3 wherein the thermoplastic in said conductive thermoplastic layer contains a plastic selected from the group consisting of polyolefins, fluoropolymers and polyamides.

5. The cell of claim 1 wherein the conductive thermoplastic layer and the dielectric thermoplastic gasket contain the same plastic.

6. The cell of claim 5 wherein said plastic is a polyolefin.

7. An unsealed double sealable cell, comprising:

(a) a conductive metal can having a bottom and a continuous sidewall disposed around the periphery of the bottom, said can having inner surfaces and outer surfaces;

(b) a conductive thermoplastic layer disposed on the inner surfaces of said can so as to extend over at least all of the inner surface of the bottom of said can, said conductive thermoplastic layer containing as its conductive material particulate conductive carbon;

(c) a conductive metal cover having a top and a continuous sidewall disposed around the periphery of the top and having inner surfaces and outer surfaces, said sidewall being disposed in a U-shape configuration at its end opposite said top; and (d) a dielectric thermoplastic gasket insert molded around the continuous sidewall of said cover and a part of the top of said cover, said dielectric thermoplastic gasket extending over all surfaces of said continuous sidewall including said U-shape configuration and extending on a part of the top of said cover on its inner and outer surfaces such that only a center portion of the inner and outer surfaces of the top of said cover remains exposed, and said dielectric thermoplastic gasket having a tapered projection located below the U-shape configuration of said cover sidewall;

wherein the combination of said conductive metal cover and said dielectric thermoplastic gasket has a total height which is less than the height of the continuous sidewall of said can and is in cooperation with and fitted into said conductive metal can.

8. The cell of claim 7 wherein the thermoplastic in said conductive thermoplastic layer contains a plastic selected from the group consisting of polyolefins, fluoropolymers and polyamides.

9. The cell of claim 7 wherein said dielectric thermoplastic gasket contains a plastic selected from the group consisting of polyolefins, fluoropolymers and polyamides.

10. The cell of claim 9 wherein the thermoplastic in said conductive thermoplastic layer contains a plastic selected from the group consisting of polyolefins, fluoropolymers and polyamides.

11. The cell of claim 7 wherein the conductive thermoplastic layer and the dielectric thermoplastic gasket contain the same plastic.

12. The cell of claim 11 wherein said plastic is a polyolefin.

13. A method of establishing a double sealed cell, comprising:

(a) making a cell containing:

(i) a conductive metal can having a bottom and a continuous sidewall disposed around the periphery of the bottom, said can having inner surfaces and outer surfaces;

(ii) a conductive thermoplastic layer disposed on the inner surfaces of said can so as to extend over at least all of the inner surface of the bottom of said can;

(iii) a conductive metal cover having a top and a continuous sidewall disposed around the periphery of the top and having inner surfaces and outer surfaces, said sidewall being disposed in a U-shape configuration at its end opposite said top; and (iv) a dielectric thermoplastic gasket insert molded around the continuous sidewall of said cover and a part of the top of said cover, said dielectric thermoplastic gasket extending over all surfaces of said continuous sidewall including said U-shape configuration and extending over a part of the top of said cover on its inner and outer surface such that only a center portion of the inner and outer surfaces of the top of said cover remains exposed, and said dielectric thermoplastic gasket having a tapered projection located below the U-shape configuration of said cover sidewall;

wherein the combination of said conductive metal cover and said dielectric thermoplastic gasket has a total height which is less than the height of the continuous sidewall of said can and is in cooperation with and is fitted into said conductive metal can;

(b) adding electrochemical components to said cell in an electrochemically functional arrangement;

(c) fitting said combinaton of cover and gasket into said can;

(d) forming a first seal by welding said dielectric thermoplastic gasket to said conductive thermoplastic layer; and, (e) forming a second seal by crimping said can sidewall over said gasket on the top of said cover.

14. The method of claim 13 wherein said welding is accomplished by ultrasonic welding.

15. The method of claim 13 wherein said conductive thermoplastic layer contains as its conductive material particulate conductive carbon.

16. The method of claim 13 wherein the thermoplastic in said conductive thermoplastic layer contains a plastic selected from the group consisting of polyolefins, fluoropolymers and polyamides.

17. The method of claim 13 wherein said dielectric thermoplastic gasket contains a plastic selected from the group consisting of polyolefins, fluoropolymers and polyamides.

18. The method of claim 17 wherein the thermoplastic in said conductive thermoplastic layer contains a plastic selected from the group consisting of polyolefins, fluoropolymers and polyamides.

19. The method of claim 13 wherein the conductive thermoplastic layer and the dielectric thermoplastic gasket contain the same plastic.

20. The method of claim 19 wherein said plastic is a polyolefin.

* * * * *